(12) United States Patent
Kinoshita et al.

(10) Patent No.: US 7,187,740 B2
(45) Date of Patent: Mar. 6, 2007

(54) COMMUNICATIONS SYSTEM

(75) Inventors: Keisuke Kinoshita, Katano (JP);
Toshiyuki Kohri, Hirakata (JP);
Susumu Morikura, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 696 days.

(21) Appl. No.: 10/648,260

(22) Filed: Aug. 27, 2003

(65) Prior Publication Data
US 2004/0042575 A1 Mar. 4, 2004

(30) Foreign Application Priority Data
Aug. 28, 2002 (JP) .............................. 2002-249329

(51) Int. Cl.
*H04L 25/08* (2006.01)
(52) U.S. Cl. ...................... 375/357; 375/354; 375/356
(58) Field of Classification Search ................ 375/357, 375/354, 355, 356; 370/503, 356; 707/205; 710/25, 74
See application file for complete search history.

(56) References Cited
U.S. PATENT DOCUMENTS
5,737,329 A * 4/1998 Horiguchi ................... 370/342

6,014,548 A * 1/2000 Balachandran et al. ..... 455/13.2
6,222,892 B1 * 4/2001 Taki et al. ................... 375/354

FOREIGN PATENT DOCUMENTS
JP 3-55932 3/1991

* cited by examiner

*Primary Examiner*—Khai Tran
(74) *Attorney, Agent, or Firm*—Wenderoth, Lind & Ponack, L.L.P.

(57) ABSTRACT

A communication system is provided in which normal communications can be ensured even upon a loss of synchronization on a part of transmission paths configuring a network.

The system is to perform data communications within a network configured by a plurality of devices. A synchronization detecting section detects a loss of synchronization for data transmission between devices connected to each other via the network. Upon detection by the synchronization detecting section of the loss of synchronization, a control information retaining section and a switching section included in the first device cause a connection with the second device to be cut off, and then again cause a connection with the device. Upon connection caused by the switching section between the devices, a connection processing section 16 performs a connecting process for enabling data communications between these devices.

8 Claims, 6 Drawing Sheets

COMMUNICATIONS SYSTEM

BACKGROUND OF THE INVENTION

1. Field of the Invention

The present invention relates to a communications system and, more specifically, a communications method for use in a system having devices inserted therein or removed therefrom.

2. Description of the Background Art

Conventionally, various techniques for recovering synchronization in communication among devices on a network have been devised. Furthermore, in recent years, digital devices have become widespread, and networks for digital devices have also been widely available. A typical example of interfaces for connecting digital devices is an interface under IEEE 1394 standards. In a digital network of IEEE 1394, for example, a function of removing and connecting an arbitrary device (plug-and-play) is often used. Even on such a network, if synchronization is lost, a process of recovering synchronization is of great importance.

In data communications using digital devices, the devices have to be synchronized with each other in data transmission and reception. In a data receiving device, if synchronization between a received data signal and a clock signal is not established, it is impossible to correctly perform data identification. In order to establish synchronization, a typical scheme is a scheme (A) of transmitting a data signal together with a clock signal, or a scheme (B) of reproducing a data signal based on a clock signal. In the scheme (A), synchronization on a transmission path is established only at data transmission. The scheme (B) includes a scheme (B1), in which synchronization on a transmission path is established only at data transmission by first transmitting a signal for establishing synchronization and then transmitting a data signal, and a scheme (B2), in which synchronization on a transmission path is always established by transmitting a signal that carries no information (idle signal) even when data transmission is not performed.

With reference to FIG. 8, a data transmitting scheme under P1394b is described below, which is one example of the above scheme (B2). First, each device is in a state of being unconnected (S1). Upon being connected to another device via a transmission path, the device detects connection and exchanges information regarding a data transfer rate with the other device. This makes it possible for the device to determine its data transfer rate and then establish connection (S2). Then, the device transmits a signal for establishing synchronization on the transmission path at the determined data transfer rate. Then, devices at both ends of the transmission path establish synchronization on the transmission path (S3). Then, the devices each perform initialization of a bus, arbitration, and then exchanges of information regarding its own device, thereby establishing synchronization among the devices (S4). During actual data communications, the devices perform arbitration there among as required, and then perform data communications (S5). Also, under P1394b, upon removal or connection of a device on a plug-and-play basis, the state of connection of the devices connected to the network is changed by a bus reset signal to a state of synchronization on the transmission path (S3). After bus reset is completed, a procedure of establishing connection among the devices is again performed through data transmission.

Here, in a network where the plug-and-play function is available, removal or connection of a device may cause noise, for example, which may lead to a loss of synchronization on a part of transmission paths among devices configuring the network. Regarding such a loss of synchronization, the inventor has found a possible occurrence of the following phenomenon in a network using P1394b.

In a communications system where state transitions such as those illustrated in FIG. 8 occur, removal/connection of a device generally causes a change in the state of the devices configuring the network from the device-connected state (S4) or the communications state (S5) to the path-synchronized state (S3). However, if removal or connection of a device causes a loss of synchronization on a part of the transmission paths of the network, the state of devices connected to that transmission path is changed to the path-connected state (S2) (refer to a dotted arrow in FIG. 8). In this case, the devices try to perform a process for establishing synchronization again, but may fail to successfully establish synchronization, thereby causing a stop of the process.

Moreover, in the above case, the malfunctioning transmission path makes it impossible to transmit a bus reset signal. Therefore, restructuring the network cannot be made. Consequently, the network is divided into two networks by the malfunctioning transmission path. Thus, it is impossible to perform communications via the malfunctioning transmission path on the network. In that case, the user conventionally has to perform the following process. First, the user locates the malfunctioning transmission path. Then, in one scheme, the user physically removes and then reconnects the located malfunctioning transmission path. In another scheme, the user resets devices at both ends of the located malfunctioning transmission path.

SUMMARY OF THE INVENTION

Therefore, an object of the present invention is to provide a communications system in which normal communications can be ensured even upon a loss of synchronization on a part of transmission paths configuring a network. Another object of the present invention is to provide a communications system in which a load on a user can be reduced upon such a loss of synchronization.

The present invention has the following features to attain the objects mentioned above. That is, a first aspect of the present invention is directed to a communications device for performing data communications within a network configured by a plurality of devices. The communications device includes: a data processing section for performing a predetermined process on data transmitted from another device connected to the communications device, and generating data to be transmitted to the other device; a synchronization detecting section for detecting a loss of synchronization in data communications with the other device; a data communications controlling section for controlling data communications between the other device and the data processing section, disabling, upon detection by the synchronization detecting section of the loss of synchronization, at least one of a data input from the other device to the data processing section or a data output from the data processing section to the other device, and then enabling again the disabled data input or data output; and a connection processing section for performing, when the data communications controlling section again enables the data input or the data output, a connecting process for enabling data communications with the other device.

In a second aspect, the data communication controlling section includes: a control information retaining section for retaining information indicative of whether a data input from the other device to the data processing section is disabled or enabled and, upon detection by the synchronization detecting section of the loss of synchronization, changing the information so as to indicate that the data input is disabled for a predetermined time period; and a switching section for logically cutting off a data transmission path from the other device to the data processing section when the information retained by the control information retaining section indicates that the data input is disabled, and causing the transmission path to a connection state when the information indicates that the data input is enabled.

In a third aspect, the control information retaining section retains information indicative of a logic of "0" as information indicating that the data input is disabled, and information indicative of a logic of "1" as information indicating that the data input is enabled. The switching section includes an AND gate supplied with the information held by the control information retaining section and a signal received from the other device.

In a fourth aspect, the data communication controlling section includes: a control information retaining section for retaining information indicative of whether a data output from the data processing section to the other device is disabled or enabled and, upon detection by the synchronization detecting section of the loss of synchronization, changing the information so as to indicate that the data output is disabled for a predetermined time period; and a switching section for logically cutting off a data transmission path from the data processing section to the other device when the information retained by the control information retaining section indicates that the data output is disabled, and connecting the transmission path when the information indicates that the data output is enabled.

In a fifth aspect, the control information retaining section retains information indicative of a logic of "0" as information indicating that the data output is disabled, and information indicative of a logic of "1" as information indicating that the data output is enabled. The switching section includes an AND gate supplied with the information held by the control information retaining section and a signal to be transmitted to the other device.

In a sixth aspect, the data communications controlling section repeatedly disables and enables at least one of the data input and the data output while the synchronization detecting section detects a loss of synchronization.

A seventh aspect of the present invention is directed to a communications system for data communications within a network configured by a plurality of devices. In this communications system, one of two arbitrary devices connected to each other in the network is the communications device according to the first aspect.

The present invention can be implemented by the communications device as described above or a communications system. Furthermore, the present invention can be implemented by a method performed by the above-described communications device.

According to the first aspect, if synchronization of the devices connected to each other in the network is lost, these devices are once logically disconnected, and are then reconnected. With this, a connecting process similar to a process performed when a device is newly connected is performed, thereby recovering the connection between these devices. Therefore, with the communications device according to the first aspect being used as a component of a network, if synchronization on a part of transmission paths configuring the network is lost, it is possible to recover communications between the devices and ensure normal communications.

Also, the above-stated disconnecting and connecting process is performed automatically by the device. Therefore, the user does not have to perform a manual operation, such as reconnecting a device. With this, it is possible to reduce the load on the user when synchronization on a part of transmission paths configuring the network is lost.

According to the second aspect, the information indicating that data input is disabled is retained for a predetermined time period after detection of a loss of synchronization. Also, while this information is retained, the connection between the devices is logically cut off. With this, it can be ensured that the connection between the devices is cut off for the predetermined time period after synchronization is lost.

According to the third aspect, the switching section is structured by an AND gate. Therefore, the communications system can be achieved in a simple structure.

According to the fourth aspect, as with the second aspect, it can be ensured that the connection between the devices is cut off for the predetermined time period after synchronization is lost.

According to the fifth aspect, as with the third aspect, the communications system can be achieved in a simple structure.

According to the sixth aspect, if a set of disconnection and reconnection does not make it possible to successfully perform a process of connecting the devices, such a set of disconnection and reconnection is repeatedly performed. Furthermore, this disconnecting and reconnecting process is performed until synchronization is established by successfully performing the process of connecting the devices. Therefore, it is possible to ensure the recovery of communications between the synchronization-lost devices and normal communications.

According to the seventh aspect, not all devices configuring the network have to be the communications devices according to the first aspect. Also, even if synchronization is lost at an arbitrary part of the network, it is possible to recover communications between the devices and ensure normal communications.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
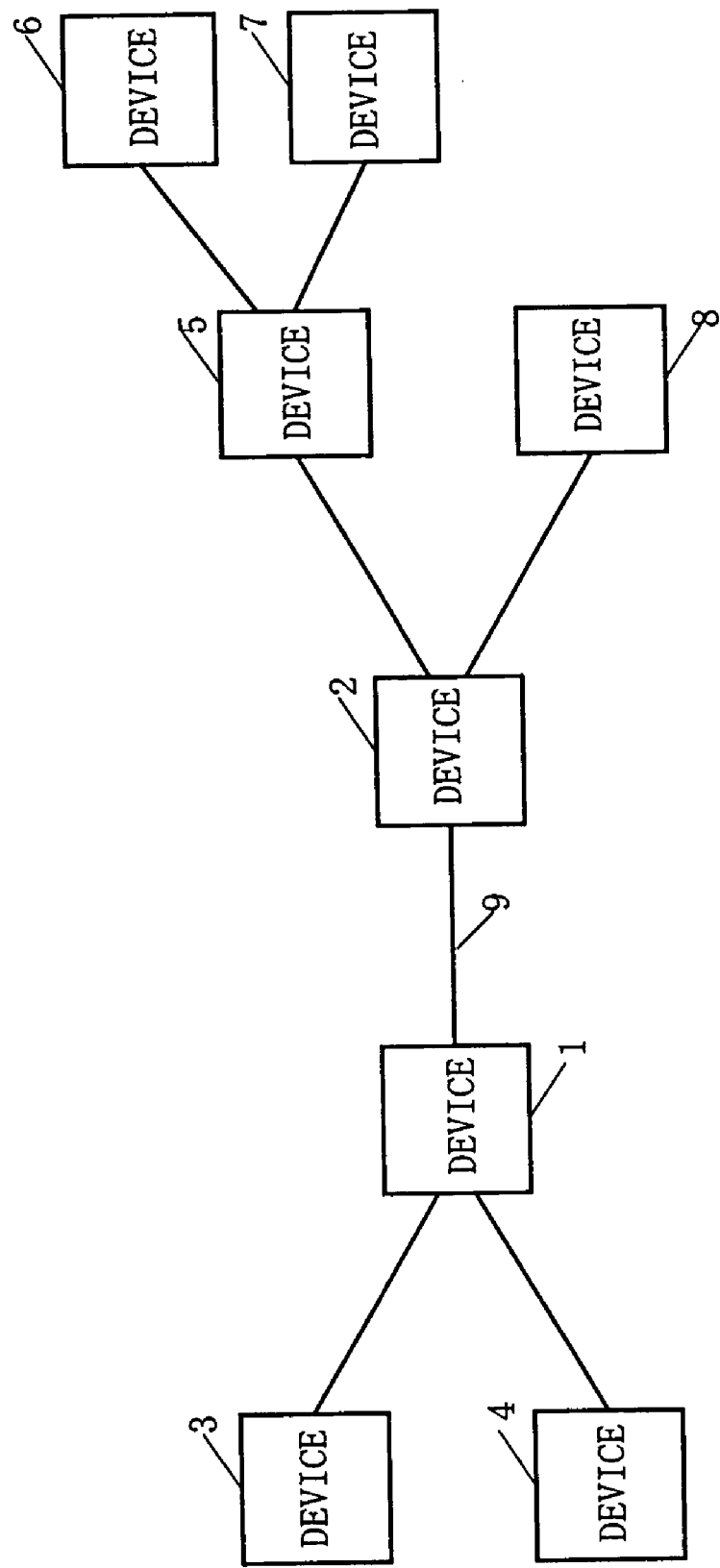
FIG. 1 is an illustration showing the entire configuration of a communications system according to a first embodiment of the present invention.

FIG. 1 is an illustration showing the entire configuration of a communications system according to a first embodiment of the present invention. In FIG. 1, the system includes eight devices (devices 1 through 8) connected in a tree shape. Also, it is assumed that the system has a feature such that synchronization on each transmission path is always established even during no data transmission. One example of systems having such a feature is a system using the P1394b protocol. In this system, upon removal or connection of a device on a plug-and-play basis at any location on the network, synchronization on a part of transmission paths among devices configuring the network may be lost. Specifically, for example, upon removal of the device 7 illustrated in FIG. 1, synchronization on a transmission path 9 between the device 1 and the device 2 may be lost.

Figure 2:
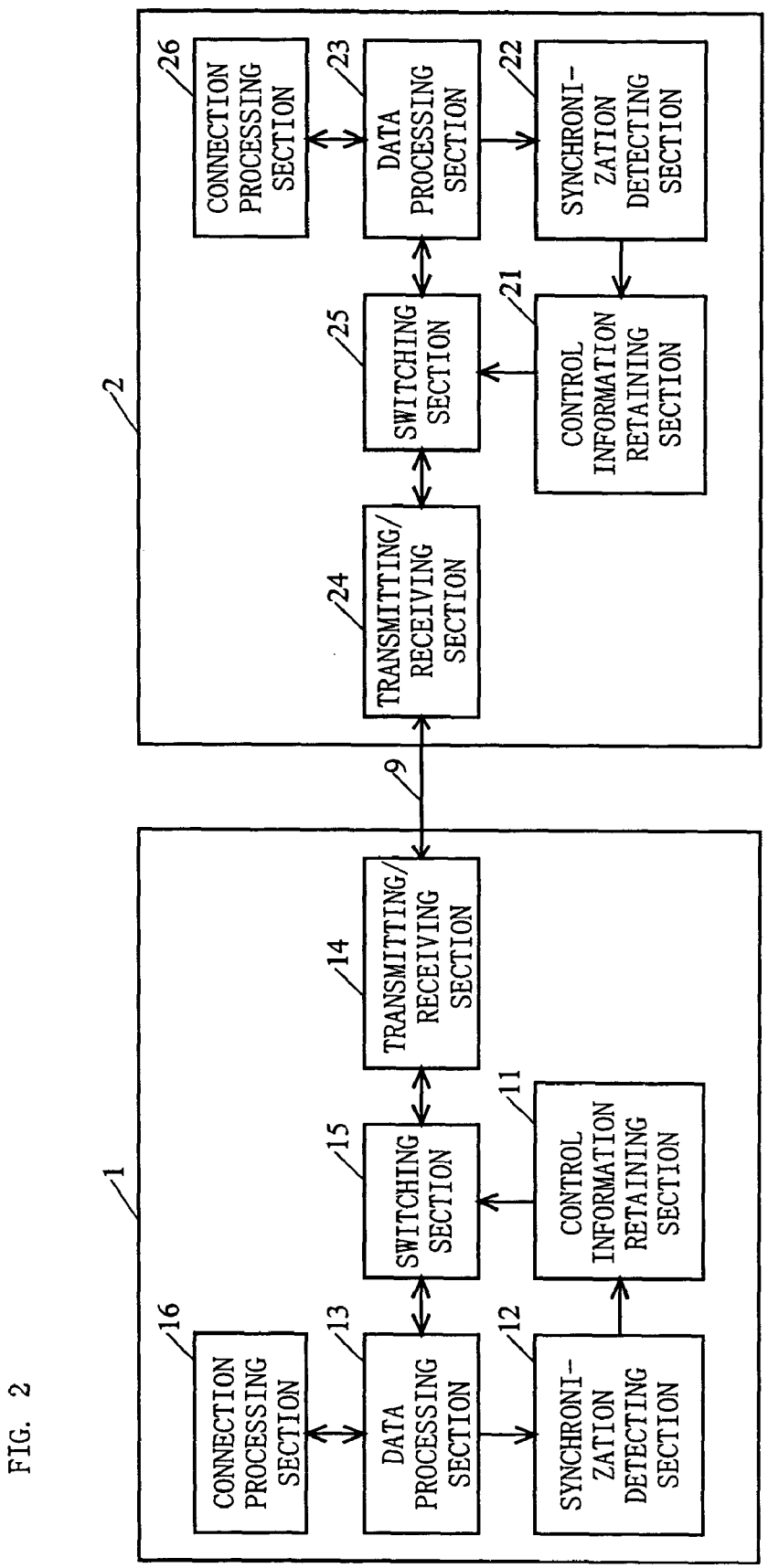
FIG. 2 is an illustration showing in detail the structure of a device 1and the structure of a device 2 illustrated in FIG. 1.

FIG. 2 is an illustration showing in detail the structure of the device 1 and the structure of the device 2 illustrated in FIG. 1. The device 1 and the device 2 are both connected to a network, and they are connected to each other via the transmission path 9. The device 1 includes a control information retaining section 11, a synchronization detecting section 12, a data processing section 13, a transmitting/receiving section 14, a switching section 15, and a connection processing section 16. The device 2 has the same structure as that of the device 1, and performs the same operation as that of the device 1. Note that, although the device 1 is also connected to the devices 3 and 4 according to FIG. 1, FIG. 2 does not show a portion related to the connection to the devices 3 and 4 for the purpose of simplifying the descriptions. The operation of the device is exemplarily described below.

The transmitting/receiving section 14 receives a signal transmitted through the transmission path 9, and then transmits the signal to the data processing section 13 via the switching section 15. The data processing section 13 performs a predetermined process on data transmitted from the device 2. In the present embodiment, the data processing section 13 performs a predetermined code converting process for converting the received signal to data that can be processed within the device 1, and then outputs the resultant data to the connection processing section 16. The output data is processed within the device 1 or is transferred to another device. Data to be transmitted from the device 1 to the device 2 is supplied to the data processing section 13. The data processing section 13 then generates data for transmission to the device 2. In the present embodiment, the data processing section 13 performs a predetermined code converting process (which is different from the above-mentioned code converting process) for converting the input data into a format suitable for transmission between the devices, and then transmits the resultant data to the transmitting/receiving section 14 via the switching section 15. The transmitting/receiving section 14 sends the signal transmitted via the switching section 15 to the transmission path 9. The sent signal is received at the transmitting/receiving section 24 of the device 2. Note that, in normal data transmission, the switching section 15 does not restrict signal transmission between the data processing section 13 and the transmitting/receiving section 14.

Here in the present embodiment, the data processing section 13 outputs, to the synchronization detecting section 12, information indicative of whether synchronization as to the signal supplied by the transmitting/receiving section 14 via the switching section 15 has been established.

The synchronization detecting section 12 detects whether synchronization has been lost on the transmission path 9, that is, between the device 1 and the device 2. Specifically, whether synchronization has been lost is detected by using the information retained in the data processing section 13 and indicative of whether synchronization has been established. That is, if the information indicates that synchronization has been established, the synchronization detecting section 12 determines that synchronization has been established. If the information indicates that synchronization has not been established, the synchronization detecting section 12 detects that synchronization has been lost. Furthermore, the data processing section 13 retains various information regarding the state of communications, which also includes the information indicative of whether synchronization has been established.

Alternatively, whether synchronization has been lost can be detected by using other information. For example, information indicative of a communication speed for data transmission between the devices can be used. In a case where data transmission between the devices is normal, this information indicates a communication speed (for example, 100 Mbps or 200 Mbps). In a case where synchronization has been lost to cease normal data transmission, the information indicates that data transmission is not normal. Therefore, also with the use of this information indicative of the communication speed, it is possible to detect whether synchronization has been lost. Furthermore, whether synchronization has been lost can be detected by using, for example, information indicative of whether a signal from the other party device has been received. In a case where the transmission path 9 is an optical transmission path, for example, this information indicates a power of an optical signal transmitted from the other party device. If this information indicates that no signal has been received from the other party device (specifically, if the power of the optical signal is smaller than a predetermined value), the synchronization detecting section 12 can determine that synchronization has been lost.

Also, the synchronization detecting section 12 outputs the detection results to the control information retaining section 11. Specifically, upon receiving from the data processing section 13 information indicating that synchronization has not been established, the synchronization detecting section 12 outputs a logic of "0" to the control information retaining section 11. On the other hand, upon receiving from the data processing section 13 information indicating that synchronization has been established, the synchronization detecting section 12 outputs a logic of "1" to the control information retaining section 11.

The control information retaining section 11 retains information (control information) indicative of whether to disable or enable a data input from the device 2 to the data processing section 13 and a data output from the data processing section 13 to the device 2. The control information is varied according to the information indicated by the signal output from the synchronization detecting section 12. Also, the control information is output as a control signal to the switching section 15. That is, upon receiving from the synchronization detecting section 12 the detection results indicating that synchronization has been lost, the control information retaining section 11 outputs a control signal to the switching section 15. In the present embodiment, the control signal is either of a signal (disconnect signal) for causing the switching section 15 to disconnect the devices and a signal for causing the switching section 15 to reconnect the devices (refer to FIG. 4). Upon receiving from the synchronization detecting section 12 the detection results indicating that synchronization has not been lost, the control information retaining section 11 does not output any control signal.

Figure 3:
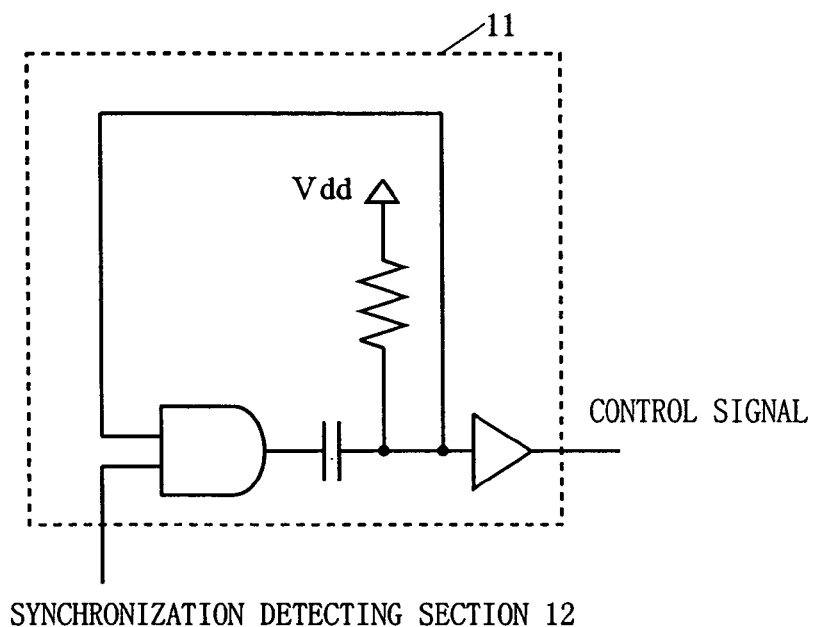
FIG. 3 is an illustration showing one example of a structure of a control information retaining section 11 illustrated in FIG. 2.
Figure 4:
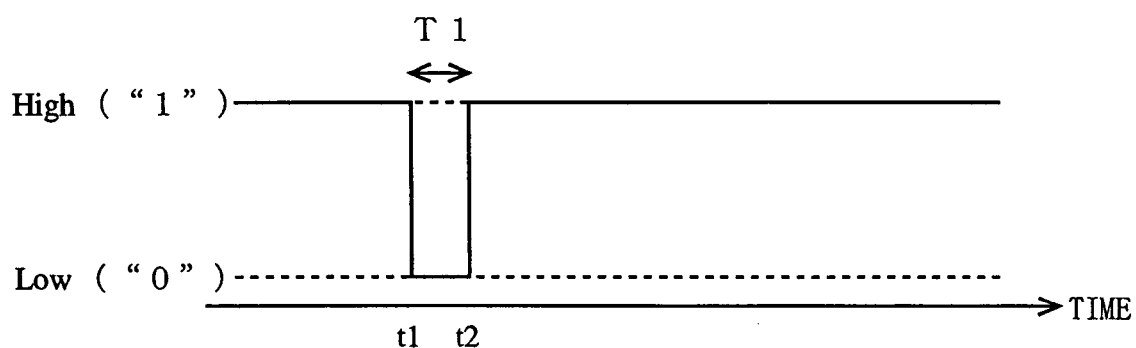
FIG. 4 is an illustration showing one example of a control signal, which is an output from a circuit illustrated in FIG. 3.

FIG. 3 is an illustration showing one example of a structure of the control information retaining section 11 illustrated in FIG. 2. FIG. 4 is an illustration showing one example of the control signal, which is an output from a circuit illustrated in FIG. 3. Here, Vdd in FIG. 3 is set to a voltage indicative of a logic of "1". In FIG. 3, if the input from the synchronization detecting section 12 indicates a logic of "1" (before a time t1), the output from the control information retaining section 11 indicates a logic of "1". Here, upon detection by the synchronization detecting section 12 that synchronization has been lost (at the time t1), the input from the synchronization detecting section 12 is changed from a logic of "1" to a logic of "0". At this time, the control information retaining section 11 outputs a control signal. Specifically, the output from the control information retaining section 11 is changed to a logic of "0". Then, a capacitor illustrated in FIG. 3 is recharged. Then, after a time period T1 has elapsed (at a time t2), the output from the control information retaining section 11 is changed to a logic of "1".

Returning to the description of FIG. 2, the switching section 15 connects or disconnects the device 1 and the device 2 based on the output from the control information retaining section 11. Specifically, upon an input from the control information retaining section 11 of a signal indicative of a logic of "0" (a disconnect signal), the switching section 15 disconnects the data processing section 13 and the transmitting/receiving section 14. In short, if the control information indicates that data input and output (a data input from the device 2 to the data processing section 13 and a data output from the data processing section 13 to the device 2) are disabled, the switching section 15 disconnects the data processing section 13 and the transmitting/receiving section 14. Also, upon an input from the control information retaining section 11 a signal indicative of a logic of "1", a connection between the data processing section 13 and the transmitting/receiving section 14 is maintained. In short, if the control signal indicates that data input/output are enabled, the switching section 15 maintains the connection between the data processing section 13 and the transmitting/receiving section 14. For example, upon an input of the signal illustrated in FIG. 4, the switching section 15 maintains the connection between the data processing section 13 and the transmitting/receiving section 14 until the time t1. Between the time t1 and the time t2, the data processing section 13 and the transmitting/receiving section 14 are disconnected. After the time t2, the connection therebetween is recovered.

Figure 8:
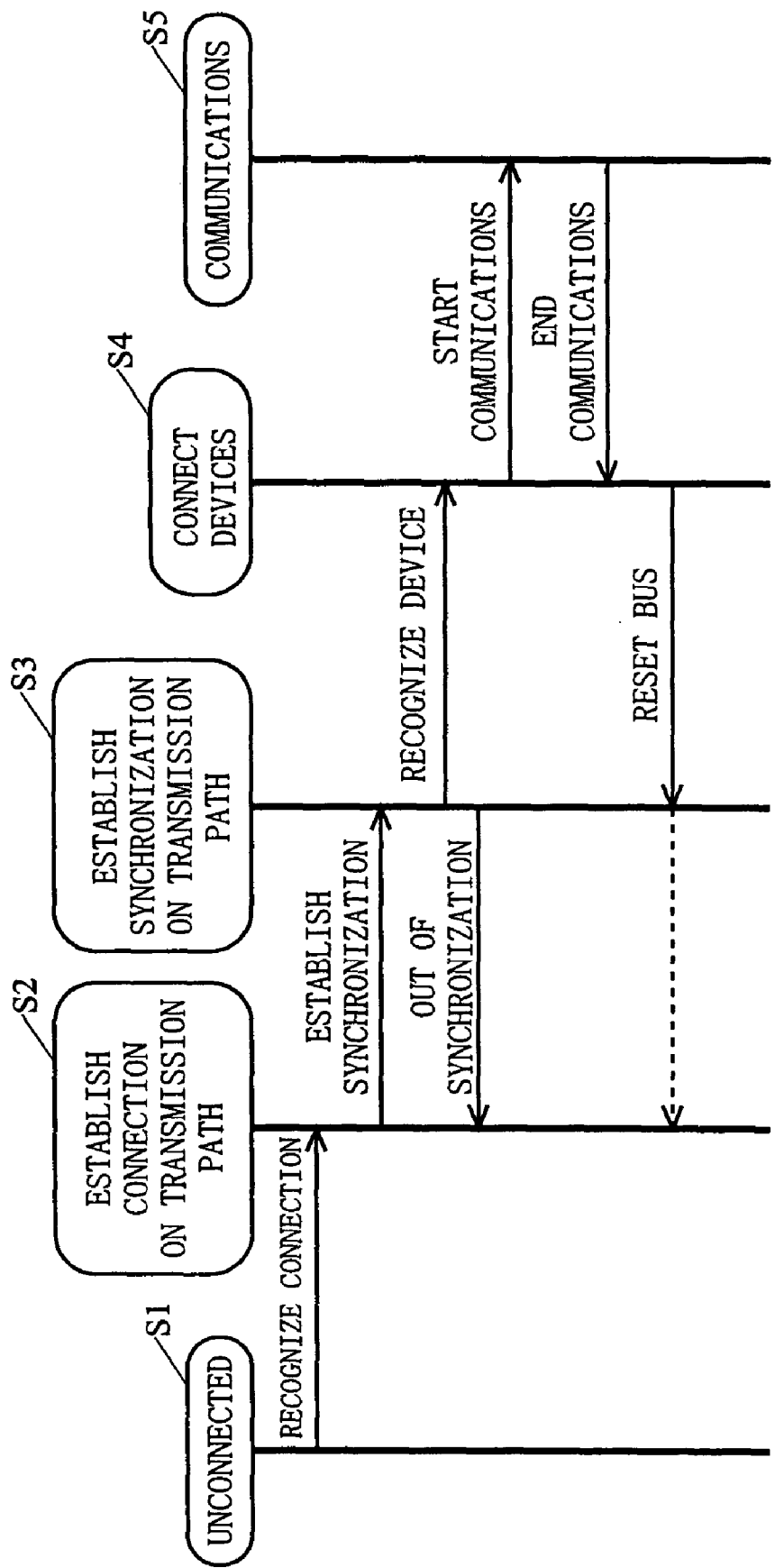
FIG. 8 is an illustration showing state transitions in a conventional system until communications is established.

As described above, the control information retaining section 11 and the switching section 15 control data communications between the device 2 and the data processing section 13. That is, upon detection by the synchronization detecting section 12 that synchronization has been lost, the control information retaining section 11 and the switching section 15 disable a data input/output between the device 2 and the data processing section 13, and then again enables the same. Therefore, if synchronization has not been established, a connection between the device 1 and the device 2 is once changed into a state of disconnection. Then, after the time period T1 has elapsed, the state is changed again to a state of connection via the transmission path 9. After the reconnection of the devices, the connection processing section 16 performs a connecting process for enabling data communications between the device 1 and the device 2. The connecting process is a process of performing a predetermined procedure complying with the standards used in the system (for example, S1 through S4 in FIG. 8). This connecting process can be similar to a process normally performed when a new device is connected. With this, a procedure of reconstructing the transmission path complying with the standards used in the network is again performed. Therefore, it is possible to successfully recover the transmission path. Note that the time period T1 is set by the control information retaining section 11 so as to make it possible to detect that a connection with the other party device (the device 2) has been cut off.

If either one of the devices 1 and 2 includes the synchronization detecting section 12, the control information retaining section 11, and the switching section 15, it is possible to recover the transmission path with the above-described operation. Therefore, in the network as a whole, it is preferable that any one of the devices connected through the transmission paths includes the above functions (the functions of the synchronization detecting section 12, the control information retaining section 11, and the switching section 15). With this, even if synchronization is lost on a transmission path at any portion of the network, a process of recovering the transmission path is always performed. Thus, communications can be normally performed on the entire network.

Figure 5:
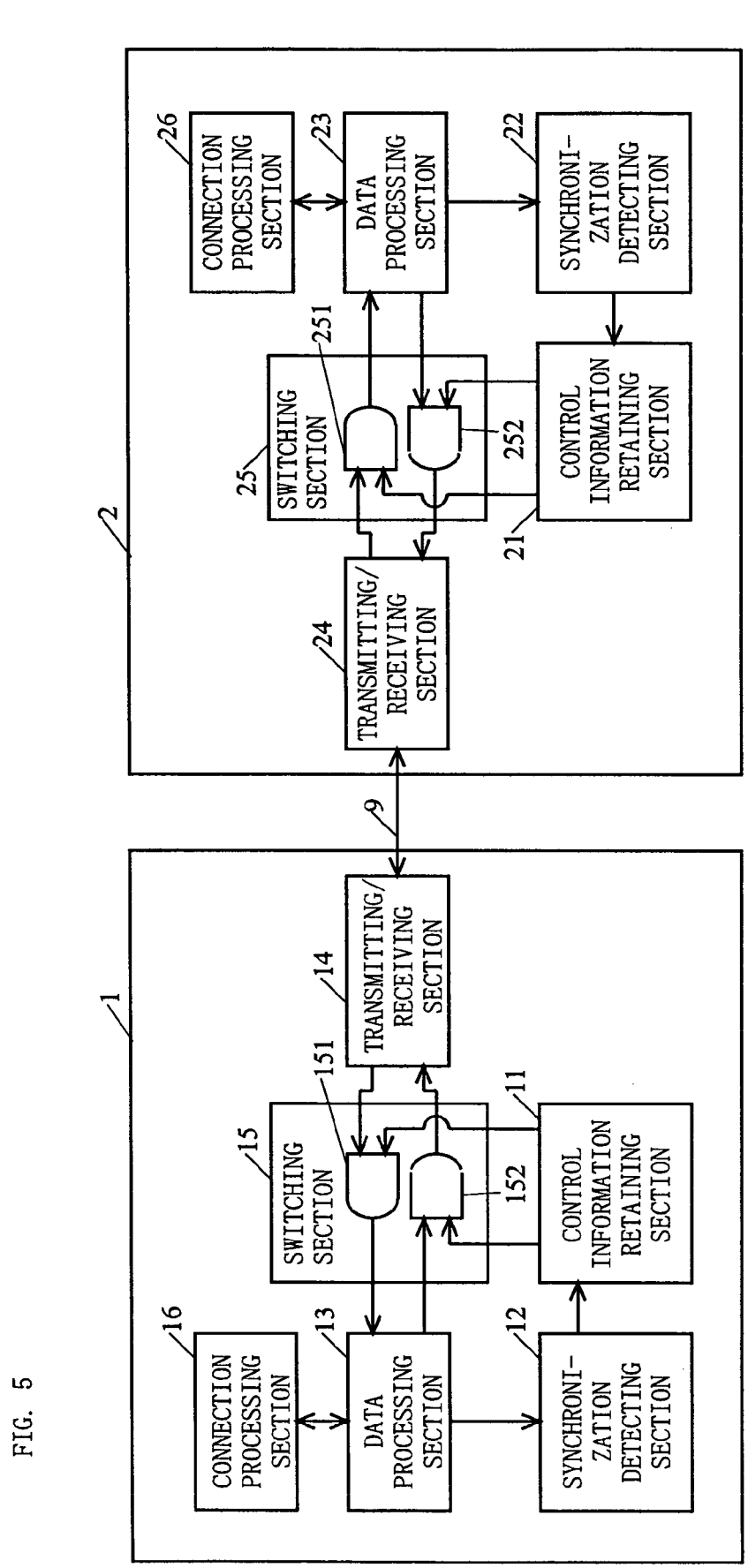
FIG. 5 is an illustration more specifically showing the device 1 illustrated in FIG. 1.

Furthermore, the switching section 15 illustrated in FIG. 1 can be structured as follows. FIG. 5 is an illustration more specifically showing the device 1 illustrated in FIG. 1. In FIG. 5, the switching section 15 includes two AND gates 151 and 152. Upon a loss of synchronization on the transmission path 9, the control information retaining section 11 outputs a signal indicative of a logic of "0" to each of the AND gates 151 and 152. Accordingly, an output from each of the AND gates 151 and 152 indicates a logic of "0", thereby causing the transmission path 9 between the device 1 and the device 2 to be logically cut off. On the other hand, while synchronization is being established, the control information retaining section 11 outputs a signal indicative of a logic of "1" to each of the AND gates 151 and 152. At this time, the data signal supplied to each AND gate is output as it is. Therefore, the transmission path 9 between the device 1 and the device 2 is in a state of connection. As such, with the use of the AND gates, the switching section 15 can be achieved. Note that AND gates 251 and 252 included in a switching section 25 of the device 2 are identical in structure to the AND gates 151 and 152, respectively.

In FIG. 5, of these four AND gates 151, 152, 251, and 252, only two AND gates 151 and 251 can be used to cut off or recover the transmission path 9. A combination of two AND gates to cut off or recover the transmission path 9 is not restricted to the above, and can be the AND gates 152 and 252, the AND gates 151 and 152, or the AND gates 251 and 252.

The above descriptions have been made only to the structure regarding the connection between the device 1 and the device 2. Here, the device 1 is required to be provided with a set(s) of the control information retaining section 11, the synchronization detecting section 12, the transmitting/receiving section 14, and the switching section 15, in accordance with the number of devices connected to the device 1. In the present embodiment, the device 1 is connected to three devices 2 through 4, and therefore is required be provided with three sets of the above-mentioned components (the control information retaining section 11, the synchronization detecting section 12, the transmitting/receiving section 14, and the switching section 15). Furthermore, the control information retaining section 11, the synchronization detecting section 12, the transmitting/receiving section 14, and the switching section 15 are each provided correspondingly to these three devices (the devices 2 through 4). At this time, the data processing section 13 outputs, to each synchronization detecting section 12, information indicative of whether synchronization has been established. Each synchronization detecting section 12 detects whether synchronization has been established on a transmission path between the device 1 and the corresponding device (the devices 2, 3 or 4). Note that the operations of each control information retaining section 11, each transmitting/receiving section 14, and each switching section 15 are the same as those described above.

Second Embodiment

A second embodiment of the present invention is described below. The second embodiment is different from the first embodiment only in the structure and operation of the control information retaining section 11. That is, in the first embodiment, the control information retaining section 11 generates a control signal only once upon a loss of synchronization. By contrast, in the second embodiment, the control information retaining section 11 generates a control signal a plurality of times. The descriptions below are made mainly to such a difference from the first embodiment.

Figure 6:
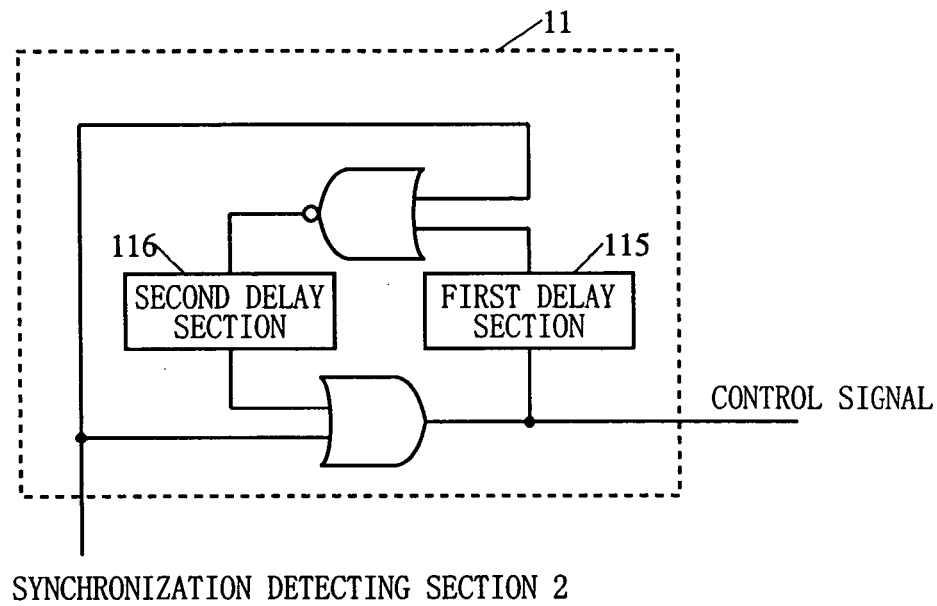
FIG. 6 is an illustration showing one example of a structure of a control information retaining section 11 in a second embodiment.
Figure 7:
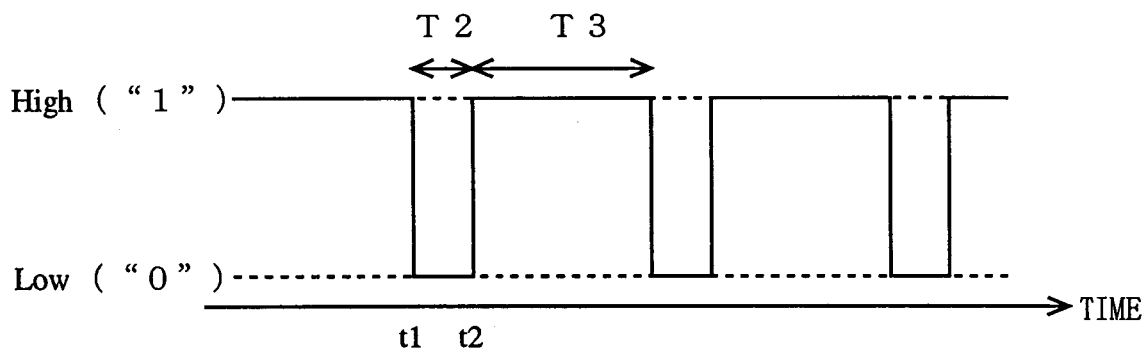
FIG. 7 is an illustration showing one example of a control signal, which is an output from a circuit illustrated in FIG. 6.

FIG. 6 is an illustration showing one example of the structure of the control information retaining section 11 in the second embodiment. FIG. 7 is an illustration showing one example of a control signal, which is an output from a circuit illustrated in FIG. 6. Here, a first delay section 115 and a second delay section 116 each delay a transition from a logic of "1" to a logic of "0" by a time period T2 and a time period T3, respectively. Also, the first delay section 115 and the second delay section 116 each delay a transition from a logic of "0" to a logic of "1" only by a time period sufficiently shorter than the time period T2 and the time period T3, respectively.

Now, if an input of the control information retaining section 11 indicates a logic of "1", that is, if an output of the synchronization detecting section 12 indicates a logic of "1", an output of the control information retaining section 11 indicates a logic of "1" (before the time t1). Here, upon detection by the synchronization detecting section 12 of a loss of synchronization (at the time t1), the input from the synchronization detecting section 12 is changed from the logic of "1" to a logic of "0". At this time, as illustrated in FIG. 7, the control information retaining section 11 repeatedly outputs control signals. That is, the control information retaining section 11 repeatedly outputs a signal indicative of a logic of "0" and a signal indicative of a logic of "1" at predetermined time intervals. Note that, the time period T2 where a state of a logic of "0" continues depends on the delay time of the first delay section 115, while the time period T3 where a state of a logic of "1" continues depends on the delay time of the second delay section 116. Also, upon a return of the input of the control information retaining section 11 to a logic of "1", the output of the control information retaining section 11 is stabilized at a logic of "1".

Therefore, if the synchronization detecting section 12 detects that synchronization on the transmission path 9 has been lost and therefore outputs a signal indicative of a logic of "0", the switching section 15 repeatedly connects and disconnects the devices. With this, even if a first disconnecting process makes it impossible to successfully reconstruct the transmission path 9 between the devices, these devices are disconnected again (after the time period T3 has elapsed). Also, once the transmission path 9 has been successfully reconstructed to establish synchronization, a disconnecting process is not performed. That is, according to the second embodiment, a process of cutting off the transmission path is repeatedly performed at intervals of the time period T3 until synchronization is established. Therefore, according to the second embodiment, communications between the devices can be recovered in a more ensured manner compared with the first embodiment.

Here, in the first embodiment, in order to ensure the recovery of the transmission path, there is a scheme of lengthening a time period (T1) for outputting a disconnect signal. However, in the first embodiment, a time period to be taken until the communications between the devices is recovered is always the time period T1. Therefore, if the time period T1 is set to be longer, a time period to be taken until the communications between the devices is recovered always becomes longer accordingly. Such a long time period until recovery may make the user feel uncomfortable. By contrast, in the second embodiment, the recovery of communications stops the control signal to be output. Therefore, the time period to be taken until the communications between the devices is recovered becomes shortened. For this reason, according to the second embodiment, it is possible to reduce a user's feeling of discomfort.

According to the above-described embodiments, in a system having a plurality of devices connected to each other, a scheme is introduced in which, if synchronization on a transmission path is lost due to removal or connection of a device, the state of the devices is once changed to a state of disconnection. With this, the transmission path between the devices is reconstructed, thereby automatically recovering the transmission path.

While the invention has been described in detail, the foregoing description is in all aspects illustrative and not restrictive. It is understood that numerous other modifications and variations can be devised without departing from the scope of the invention.

What is claimed is:

1. A communications device for performing data communications within a network configured by a plurality of devices, the communications device comprising:

a data processing section for performing a predetermined process on data transmitted from another device connected to the communications device and generating data to be transmitted to the other device;

a synchronization detecting section for detecting a loss of synchronization in data communications with the other device;

a data communications controlling section for controlling data communications between the other device and the data processing section, disabling, upon detection by the synchronization detecting section of the loss of synchronization, at least one of a data input from the other device to the data processing section or a data output from the data processing section to the other device, and then enabling again the disabled data input or data output; and a connection processing section for performing, when the data communications controlling section again enables the data input or the data output, a connecting process for enabling data communications with the other device.

2. The communications device according to claim 1, wherein
the data communication controlling section includes:
a control information retaining section for retaining information indicative of whether a data input from the other device to the data processing section is disabled or enabled and, upon detection by the synchronization detecting section of the loss of synchronization, changing the information so as to indicate that the data input is disabled for a predetermined time period; and
a switching section for logically cutting off a data transmission path from the other device to the data processing section when the information retained by the control information retaining section indicates that the data input is disabled, and causing the transmission path to achieve a connection state when the information indicates that the data input is enabled.

3. The communications device according to claim 2, wherein
the control information retaining section retains information indicative of a logic of "0" as information indicating that the data input is disabled, and information indicative of a logic of "1" as information indicating that the data input is enabled, and
the switching section includes an AND gate supplied with the information held by the control information retaining section and a signal received from the other device.

4. The communications device according to claim 1, wherein
the data communication controlling section includes:
a control information retaining section for retaining information indicative of whether a data output from the data processing section to the other device is disabled or enabled and, upon detection by the synchronization detecting section of the loss of synchronization, changing the information so as to indicate that the data output is disabled for a predetermined time period; and
a switching section for logically cutting off a data transmission path from the data processing section to the other device when the information retained by the control information retaining section indicates that the data output is disabled, and causing the transmission path to achieve a connection state when the information indicates that the data output is enabled.

5. The communications device according to claim 4, wherein
the control information retaining section retains information indicative of a logic of "0" as information indicating that the data output is disabled, and information indicative of a logic of "1" as information indicating that the data output is enabled, and
the switching section includes an AND gate supplied with the information held by the control information retaining section and a signal to be transmitted to the other device.

6. The communications device according to claim 1, wherein
the data communications controlling section repeatedly disables and enables at least one of the data input and the data output while the synchronization detecting section detects a loss of synchronization.

7. A communications system for data communications within a network configured by a plurality of devices, wherein
one of two arbitrary devices connected to each other in the network is the communications device according to claim 1.

8. A communications method for use in a communications device for performing data communications in a network configured by a plurality of devices, the communications device including a data processing section for performing a predetermined process on data transmitted from another device connected to the communications device and generating data to be transmitted to the other device, the communications method comprising:
a synchronization detecting step of detecting a loss of synchronization in data communications with the other device;
a data communications controlling step of controlling data communications between the other device and the data processing section, disabling, upon detection in the synchronization detecting step of the loss of synchronization, at least one of a data input from the other device to the data processing section or a data output from the data processing section to the other device, and then enabling again the disabled data input or data output; and
a connection processing step of performing, when the data input or the data output is again enabled in the data communications controlling step, a connecting process for enabling data communications with the other device.

* * * * *